United States Patent Office 3,174,983
Patented Mar. 23, 1965

3,174,983
1-AMINO-4-HYDROXY-2-SUBSTITUTED
ARYLOXY-ANTHRAQUINONE
Visvanathan Ramanathan, Basel, Switzerland, assignor to Ciba Limited, Basel, Switzerland, a company of Switzerland
No Drawing. Filed Apr. 3, 1963, Ser. No. 270,168
Claims priority, application Switzerland, Apr. 6, 1962, 4,229/62
6 Claims. (Cl. 260—380)

The present invention provides 1-amino-4-hydroxy-anthraquinones that contain, in 2-position, an aryloxy group that is substituted by one or several alkyl radicals which may be in the form of a ring condensed with the aryl nucleus.

The dyestuffs of the invention preferably correspond to the formula

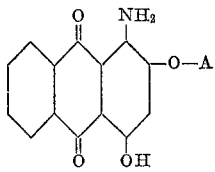

in which A represents an alkyl phenyl radical whose alkyl radicals contain 3 to 9 carbon atoms, but advantageously 3 to 6 carbon atoms.

The new dyestuffs may be obtained when a 1-amino-2-halogen-4-hydroxy-anthraquinone is reacted with a hydroxyaryl compound that contains one or more alkyl groups which may be in the form of a ring condensed with the aryl nucleus. The said alkyl groups preferably contain 3 to 9 carbon atoms.

As starting materials there may be specially mentioned 1-amino-2-bromo-4-hydroxy-anthraquinone and 1-amino-2-chloro-4-hydroxy-anthraquinone.

As hydroxy-aryl compounds there may be specially mentioned alkyl phenols. There may be used a very wide variety of alkyl phenols containing alkyl radicals having 3 to 9 carbon atoms, but advantageously 3 to 6 carbon atoms, for example, alkyl phenols containing branched alkyl radicals, for example, Tertiary butylphenol,
Tertiary amylphenol,
Iso-propylphenol,
2:2-di-(4'-hydroxyphenyl)-propane, but more especially 4-tertiary butylphenol or alkylphenols with straight-chain aliphatic radicals, for example, n-Butylphenol,
n-Hexylphenol,
2:4-dimethylphenol,
3:4-dimethylphenol, but more especially
4-n-alkylphenols such as 4-n-butylphenol, or hydroxyaryl compounds in which the alkyl radical forms a ring with the phenyl radical, for example, the tetra hydronaphthols, but more especially β-tetra hydronaphthol.

The reaction of the invention is advantageously carried out in the presence of an agent capable of binding acid. Such agents are, for example, alkali metal hydroxides, for example, sodium hydroxide or potassium hydroxide, or alkali metal carbonates or bicarbonates, for example, potassium carbonate or potassium bicarbonate, sodium carbonate or sodium bicarbonate, and potassium acetate or sodium acetate.

The reaction of the invention can be carried out in an inert solvent, for example, in nitrobenzene, or in an excess of the phenolic reaction component. The reaction is advantageously performed at an elevated temperature.

The hydroxy-aryl compounds to be used as starting materials in the process of the invention are much easier to remove from the reaction mixture and much easier to work up than, for example, phenol or halogen phenols, and they exhibit a much lower degree of toxicity than phenol or halogen phenols.

The new dyestuffs, especially after conversion into a finely dispersed form, are eminently suitable for dyeing and printing synthetic fibrous material, especially material made of aromatic polyesters. Red dyeings that are distinguished by a specially good fastness to light and especially good fastness to sublimation are obtained on such material when the dyestuffs are applied by the usual dyeing methods, for example, from a dyebath that contains a dispersion of the dyestuff and advantageously a dispersing agent at a temperature close to 100° C., if necessary in the presence of a swelling agent, but advantageously at a temperature above 100° C. with the application of super-atmospheric pressure.

A further attribute of the dyestuffs of the invention is that they give a good reservation of wool, which makes them specially suitable for dyeing union fabrics made of polyester fibers and wool.

The dyestuffs of the invention are also suitable for application by the so-called Thermosol process, in which process the fabric to be dyed is impregnated, advantageously at a temperature not exceeding 60° C., with an aqueous dispersion of the dyestuff that advantageously contains 1 to 50% of urea and a thickening agent, especially sodium alginate, and then squeezed in the usual manner. Advantageously, the fabric is squeezed in such a manner that it retains 50 to 100% of dyeliquor, calculated on its dry weight. In order to bring about fixation of the dyestuff, the fabric thus impregnated is heated to a temperature above 100° C., for example, between 180 and 210° C., advantageously after an intermediate drying, for example, in a current of hot air.

The above-mentioned Thermosol process is of special interest for dyeing union fabrics made of polyester fibers and cellulosic fibers, especially cotton. In this case, the padding liquor contains dyestuffs suitable for dyeing cotton, for example, vat dyestuffs, in addition to the dyestuff of the invention. When vat dyestuffs are used, the padded fabric has to be treated, after the heat treatment, with an aqueous alkaline solution of a reducing agent normally used in vat dyeing.

The following examples illustrate the invention. Unless otherwise stated, the parts and percentages are by weight:

*Example 1*

48 parts of 1-amino-2-bromo-4-hydroxy-anthraquinone, 240 parts of 4-tertiary-butylphenol and 24 parts of potassium hydroxide are mixed together and the mixture is heated for about 16 hours at 150° C. The mixture is allowed to cool somewhat, and then 160 parts of aqueous sodium hydroxide solution of 40% strength and 1200 parts of water are added while stirring. The precipitated dyestuff is filtered off and dried. It dissolves in organic solvents to give a red solution and dyes polyester fibers red tints possessing very good properties of fastness when applied in the form of a fine dispersion.

*Example 2*

25.4 parts of 1-amino-2-bromo-4-hydoxy-anthraquinone, 100 parts of 4-tertiary-butylphenol and 6.5 parts of potassium carbonate are mixed together and the mixture is heated for about 24 hours at 155° C. The reaction mixture is allowed to cool and then 130 parts of alcohol are added while stirring. The precipitated dyestuff is filtered off and is then washed with hot water. The filter residue is dried. The dyestuff so obtained corresponds to the dyestuff obtained in the manner described in Example 1.

Example 3

25.4 parts of 1-amino-2-bromo-4-hydroxy-anthraquinone, 100 parts of tetra hydro-β-naphthol and 6.5 parts of potassium carbonate are mixed together and the mixture is heated for about 9 hours at 155° C. while stirring. After cooling the reaction mixture, 100 parts of alcohol are added while stirring, the precipitated dyestuff is filtered off, and then washed with water.

The dyestuff so obtained is soluble in organic solvents, giving a red solution. It dyes polyester fibers red tints possessing very good properties of fastness when applied in the form of a fine dispersion. When dyeing is carried out in the manner described in Example 6, dyeings are obtained possessing properties of fastness similar to those obtained according to Example 7.

Example 4

12.7 parts of 1-amino-2-bromo-4-hydroxy-anthraquinone, 62.5 parts of 2:2-di-(4'-hydroxyphenyl)-propane and 3.25 parts of potassium carbonate are heated for about 24 hours at 160° C. while stirring. The reaction mixture is allowed to cool somewhat and then 45 parts of aqueous sodium hydroxide solution of 30% strength and 700 parts of water are added. The precipitated dyestuff is filtered off, acidified, and then washed with water. It dissolves in organic solvents to give a red solution and dyes polyester fibers red tints possessing very good properties of fastness when applied in the form of a fine dispersion.

Example 5

25 parts of 1-amino-2-bromo-4-hydroxy-anthraquinone, 100 parts of 3:4-dimethylphenol and 6.5 parts of potassium carbonate are mixed together and the mixture is heated for about 24 hours at 155° C. while stirring. After cooling the reaction mixture, 100 parts of alcohol are added while stirring, the precipitated dyestuff is filtered off and washed with water. It dyes polyester fibers red tints possessing a good fastness to light and a good fastness to sublimation.

When, instead of 3:4-dimethylphenol, the same proportion of 2:4-dimethylphenol is used, the reaction mixture is heated to 170 to 175° C., the reaction mixture is cooled, the dyestuff is precipitated with alcohol and then purified chromatographically, the dyestuff so obtained dyes polyester fibers yellowish red tints possessing a very good fastness to light and to sublimation.

Example 6

1 part of an aqueous paste of the dyestuff obtained in the manner described in Example 1 and approximately 1 part of dried sulfite cellulose waste liquor are ground to a fine paste in a roller mill, the paste so obtained having a dyestuff content of about 10%.

100 parts of fibrous material made of polyethylene terephthalate are washed for ½ hour in a bath that contains 1 to 2 parts of the sodium salt of N-benzyl-μ-heptadecylbenzimidazole disulfonic acid and 1 part of concentrated aqueous ammonia solution in 1000 parts of water. The material is then entered into a dyebath of 3000 parts of water in which are dispersed 10 parts of the dyestuff paste obtained as described in the above paragraph and which also contains 54 parts of the sodium salt of N-benzyl-μ-heptadecylbenzimidazole disulfonic acid. The whole is heated in a pressure vessel to 120° C. and maintained at that temperature for about ½ hour. The material is then well rinsed and, if necessary, washed for ½ hour at 60 to 80° C. in a solution of 1 part of the sodium salt of N-benzyl-μ-heptadecylbenzimidazole disulfonic acid in 1000 parts of water. A red dyeing possessing very good properties of fastness is obtained.

Example 7

100 parts of fibrous material made of polyethylene terephthalate are washed for ½ hour in a bath that contains 1 to 2 parts of the sodium salt of N-benzyl-μ-heptadecylbenzimidazole disulfonic acid and 1 part of concentrated aqueous ammonia solution in 1000 parts of water. The material is then entered into a dyebath of 3000 parts of water containing 9 parts of diammonium phosphate and 1.5 parts of the sodium salt of N-benzyl-μ-heptadecylbenzimidazole disulfonic acid, and is treated therein for 15 minutes at 50°. 9 parts of dissolved sodium-orthophenylphenolate are slowly added, and uptake of the liberated ortho-phenylphenol is effected by agitating the textile material for 15 minutes at 50 to 55° C. The dyestuff paste obtained in the manner described in the first paragraph of Example 4 is then added. The bath is then brought to the boil in the course of ½ to ¾ hour and dyeing is continued as close to the boil as possible for 1 to 1½ hours. After the dyeing operation, the fabric is well rinsed and, if necessary, washed for ½ hour at 60 to 80° C. in a solution of 1 part of the sodium salt of N-benzyl-μ-heptadecylbenzimidazole disulfonic acid in 1000 parts of water. A red dyeing possessing a good fastness to sublimation and to light is obtained.

What is claimed is:

1. An anthraquinone dyestuff of the formula

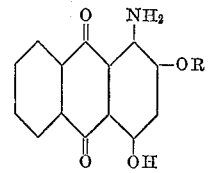

in which R is a member selected from the group consisting of the radicals of the formulae

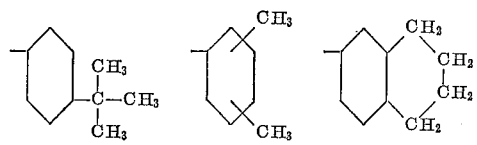

and

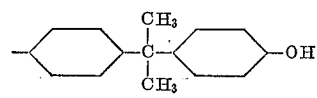

2. An anthraquinone of the formula

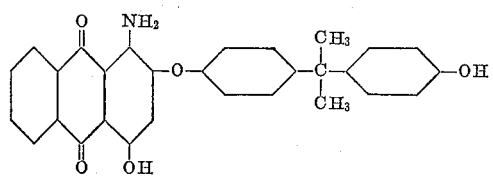

3. An anthraquinone of the formula

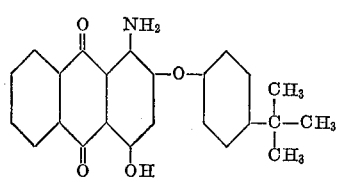

4. An anthraquinone of the formula
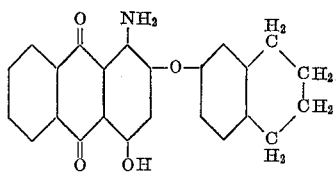
5. An anthraquinone of the formula
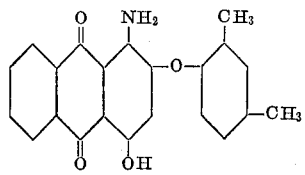
6. An anthraquinone of the formula
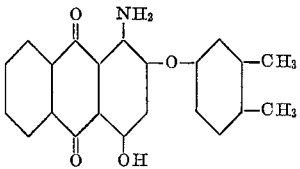
References Cited by the Examiner
UNITED STATES PATENTS
2,992,240  7/61  Lodge _____ 260—380
FOREIGN PATENTS
317,471  1/57  Switzerland.
LEON ZITVER, *Primary Examiner.*